US012224109B2

(12) United States Patent
Yoshizawa et al.

(10) Patent No.: US 12,224,109 B2
(45) Date of Patent: Feb. 11, 2025

(54) COIL COMPONENT

(71) Applicant: TAIYO YUDEN CO., LTD., Tokyo (JP)

(72) Inventors: Takanori Yoshizawa, Tokyo (JP); Masanori Okawara, Tokyo (JP); Hideharu Suzuki, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 666 days.

(21) Appl. No.: 17/498,370

(22) Filed: Oct. 11, 2021

(65) Prior Publication Data

US 2022/0148795 A1 May 12, 2022

(30) Foreign Application Priority Data

Nov. 10, 2020 (JP) ................................ 2020-187208

(51) Int. Cl.

| | |
|---|---|
| ***H01F 17/04*** | (2006.01) |
| ***H01F 27/255*** | (2006.01) |
| ***H01F 27/28*** | (2006.01) |
| ***H01F 27/29*** | (2006.01) |

(52) U.S. Cl.

CPC ......... *H01F 27/292* (2013.01); *H01F 27/255* (2013.01); *H01F 27/2828* (2013.01)

(58) Field of Classification Search

CPC .................................................... H01F 27/292

USPC ......................................................... 336/221

See application file for complete search history.

(56) References Cited

U.S. PATENT DOCUMENTS

| | | | | |
|---|---|---|---|---|
| 2007/0188281 | A1 * | 8/2007 | Iguchi | H05K 3/3426 335/299 |
| 2009/0058588 | A1 | 3/2009 | Suzuki et al. | |
| 2013/0099884 | A1 * | 4/2013 | Liang | H01F 27/292 336/83 |
| 2013/0194060 | A1 * | 8/2013 | Nakada | H01F 17/045 336/192 |
| 2020/0105452 | A1 | 4/2020 | Suzuki et al. | |

FOREIGN PATENT DOCUMENTS

| | | |
|---|---|---|
| JP | 2009-064894 A | 3/2009 |
| JP | 2010-171054 A | 8/2010 |
| JP | 2020-057655 A | 4/2020 |

OTHER PUBLICATIONS

English translation of JP2010171054 (Year: 2010).*

* cited by examiner

*Primary Examiner* — Ronald Hinson

(74) *Attorney, Agent, or Firm* — Pillsbury Winthrop Shaw Pittman, LLP

(57) ABSTRACT

A coil component includes a core, a conductive wire, and a solder portion. The core includes a mounting surface extending from one end to the other end along a one-axis direction, a recessed portion connected to the one end of the mounting surface in the one-axis direction and recessed from the mounting surface, and an end surface connected to the recessed portion. The conductive wire has one end disposed at the recessed portion. The solder portion is provided at the recessed portion to be electrically connected to one end of the conductive wire. The solder portion includes a peak projecting from the mounting surface, an inner region located farther from the end surface than the peak in the one-axis direction, and an outer region located closer to the end surface than the peak in the one-axis direction and having a larger volume than the inner region.

10 Claims, 9 Drawing Sheets

COIL COMPONENT

CROSS-REFERENCE TO RELATED APPLICATIONS

This application is based on and claims the benefit of priority from Japanese Patent Application Serial No. 2020-187208 (filed on Nov. 10, 2020), the contents of which are hereby incorporated by reference in their entirety.

TECHNICAL FIELD

The present invention relates to a coil component.

BACKGROUND

In the related art, a winding-type coil component including a core and a conductive wire wound around the core is known. As described in Japanese Patent Laid-Open Nos. 2010-171054, 2009-64894, and 2020-057655, a winding-type coil component in the related art may include a recessed portion provided in a core mounting surface, and an end portion of a conductive wire may be drawn to the recessed portion. The recessed portion is filled with solder to cover the end portion of the conductive wire. If the winding type coil component is heated at the time of mounting, the solder with which the recessed portion is filled is melted to generate molten solder, and the molten solder wet-spreads along a land. The winding-type coil component is joined to the land of a mounting board by the wet spreading solder being solidified. After the mounting, whether the winding-type coil component has been joined normally to the land is inspected on the basis of the shape of solder fillet formed from an end surface of the core of the mounted winding-type coil component to the land.

The winding-type coil component with the end portion of the conductive wire drawn to the recessed portion formed in the mounting surface has a problem that it may not be possible to determine whether joint has satisfactorily been achieved on the basis of the shape of the solder fillet since the molten solder is unlikely to wet-spread up to the end surface of the core at the time of the mounting.

SUMMARY

An object of the present invention is to at least partially solve or alleviate the aforementioned problem. One of more specific objects of the present invention is to facilitate flowing of solder to an end surface of a core when a winding-type coil component with an end portion of a conductor drawn to a recessed portion of a mounting surface of a core is mounted on a mounting board. Object other than the aforementioned objects of the present invention will be clarified throughout the description in the specification. The invention described in claims may solve problems other than the problems ascertained from "Description of the Related Art".

A coil component according to one or more embodiments of the present invention includes a core, a conductive wire, and a solder portion. In the one or more embodiments of the present invention, the core includes a mounting surface extending from one end to the other end along a one-axis direction, a recessed portion connected to the one end of the mounting surface in the one-axis direction and recessed from the mounting surface, and an end surface connected to the recessed portion. In the one or more embodiments of the present invention, the conductive wire has one end disposed at the recessed portion. In the one or more embodiments of the present invention, the solder portion is provided at the recessed portion to be electrically connected to one end of the conductive wire. In the one or more embodiments of the present invention, the solder portion includes a peak projecting from the mounting surface, an inner region located farther from the end surface than the peak in the one-axis direction, and an outer region located closer to the end surface than the peak in the one-axis direction and having a larger volume than the inner region.

In the one or more embodiments of the present invention, the outer region has a larger surface area than the inner region.

In the one or more embodiments of the present invention, the solder portion is separated from the end surface.

In the one or more embodiments of the present invention, the solder portion is in contact with the end surface.

In the one or more embodiments of the present invention, the solder portion covers a connecting region in the end surface, the connecting region being continuous with the mounting surface.

In the one or more embodiments of the present invention, the peak of the solder portion is located closer to the other end than a center of a section of the conductive wire in the one-axis direction.

In the one or more embodiments of the present invention, the recessed portion is defined by a recessed portion surface occupying a part of a surface of the core. In the one or more embodiments of the present invention, the recessed portion surface includes a bottom surface and a connecting surface disposed between the bottom surface and the end surface in the one-axis direction and disposed between the mounting surface and the bottom surface of the recessed portion in a direction that is perpendicular to the one-axis direction.

In the one or more embodiments of the present invention, the recessed portion surface includes an intermediate surface disposed between the bottom surface and the mounting surface in the one-axis direction and disposed between the mounting surface and the connecting surface in the direction that is perpendicular to the one-axis direction.

In the one or more embodiments of the present invention, a diameter of the conductive wire is smaller than a distance between the mounting surface and the bottom surface.

In the one or more embodiments of the present invention, an area of the outer region is larger than an area of the inner region in a sectional view cut along a plane that is perpendicular to the mounting surface and the end surface.

Advantages

According to the present invention disclosed in the specification, it is possible to facilitate flowing of solder to an end surface of a core when a winding-type coil component with an end portion of a conductor drawn to a recessed portion of a mounting surface of a core is mounted on a mounting board.

DESCRIPTION OF THE PREFERRED EMBODIMENTS

Hereinafter, various embodiments of the present invention will be described with reference to the drawings as needed. Note that the same reference signs will be applied to components that are common in a plurality of drawings throughout the plurality of drawings. It should be noted that the drawings are not necessarily illustrated with exact scales for convenience of explanation.

Figure 1:
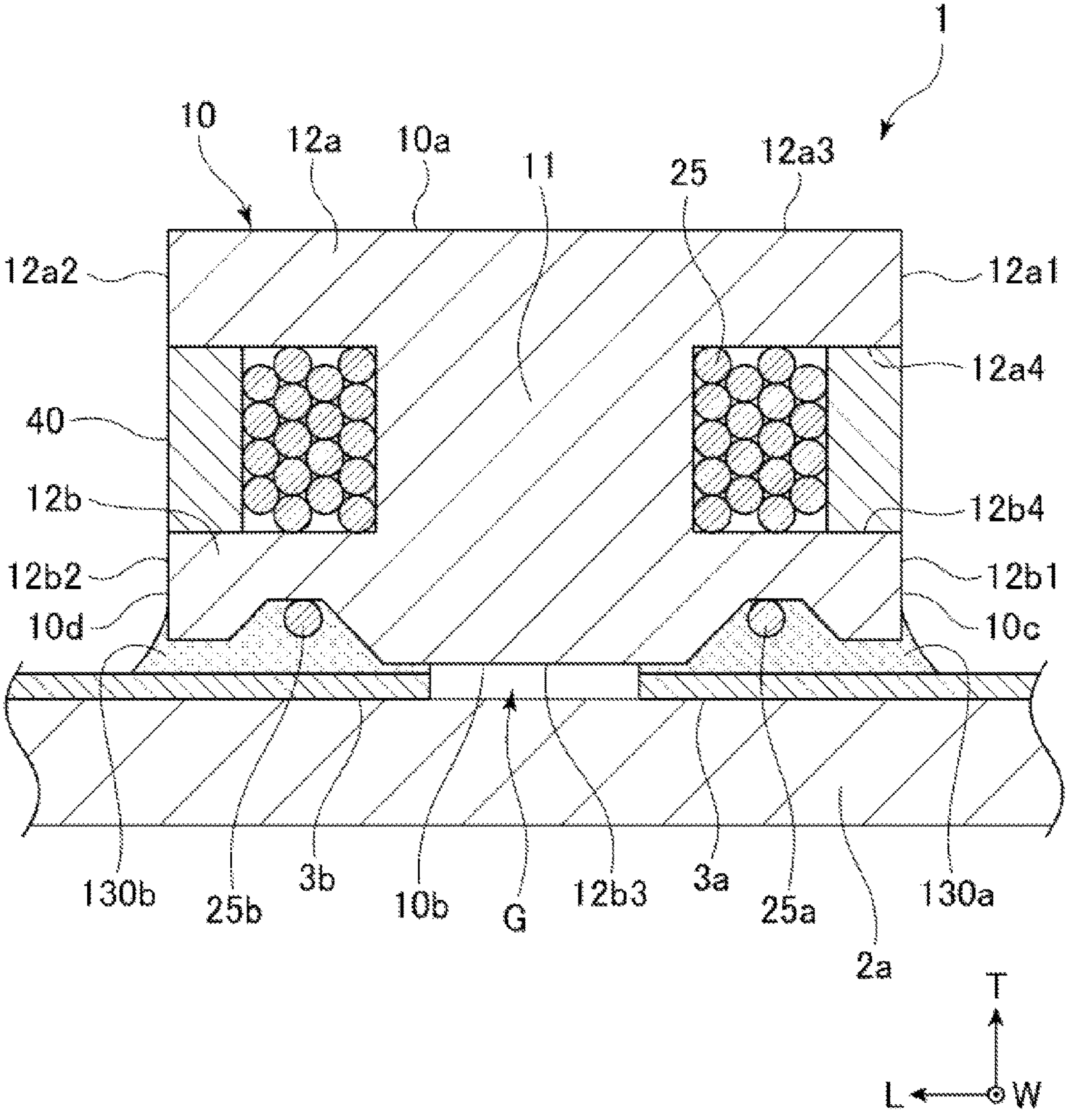
FIG. 1 is a vertical sectional view of a coil component according to an embodiment of the present invention that is mounted on a mounting board.
Figure 2:
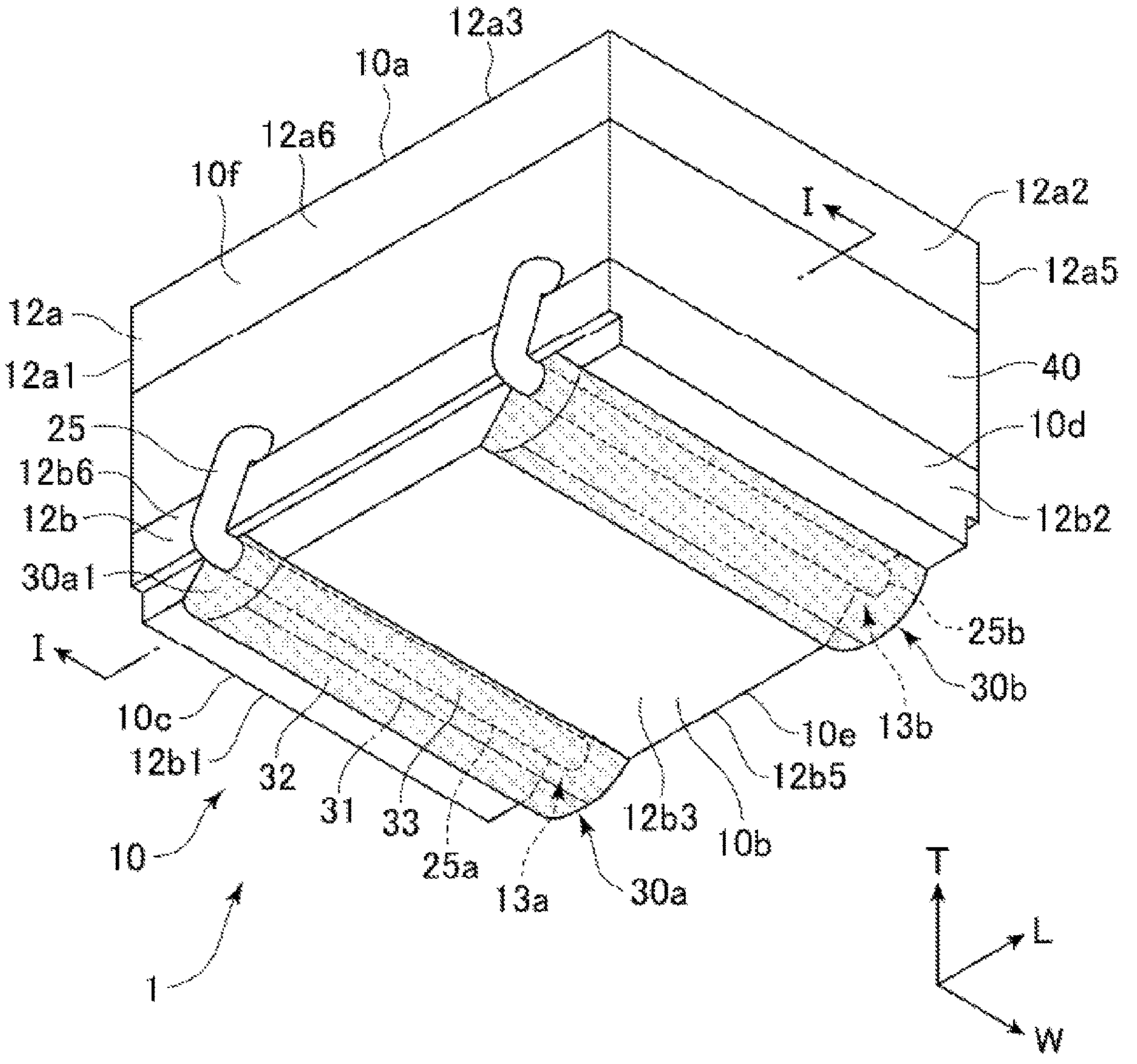
FIG. 2 is a perspective view of the coil component illustrated in FIG. 1.
Figure 3:
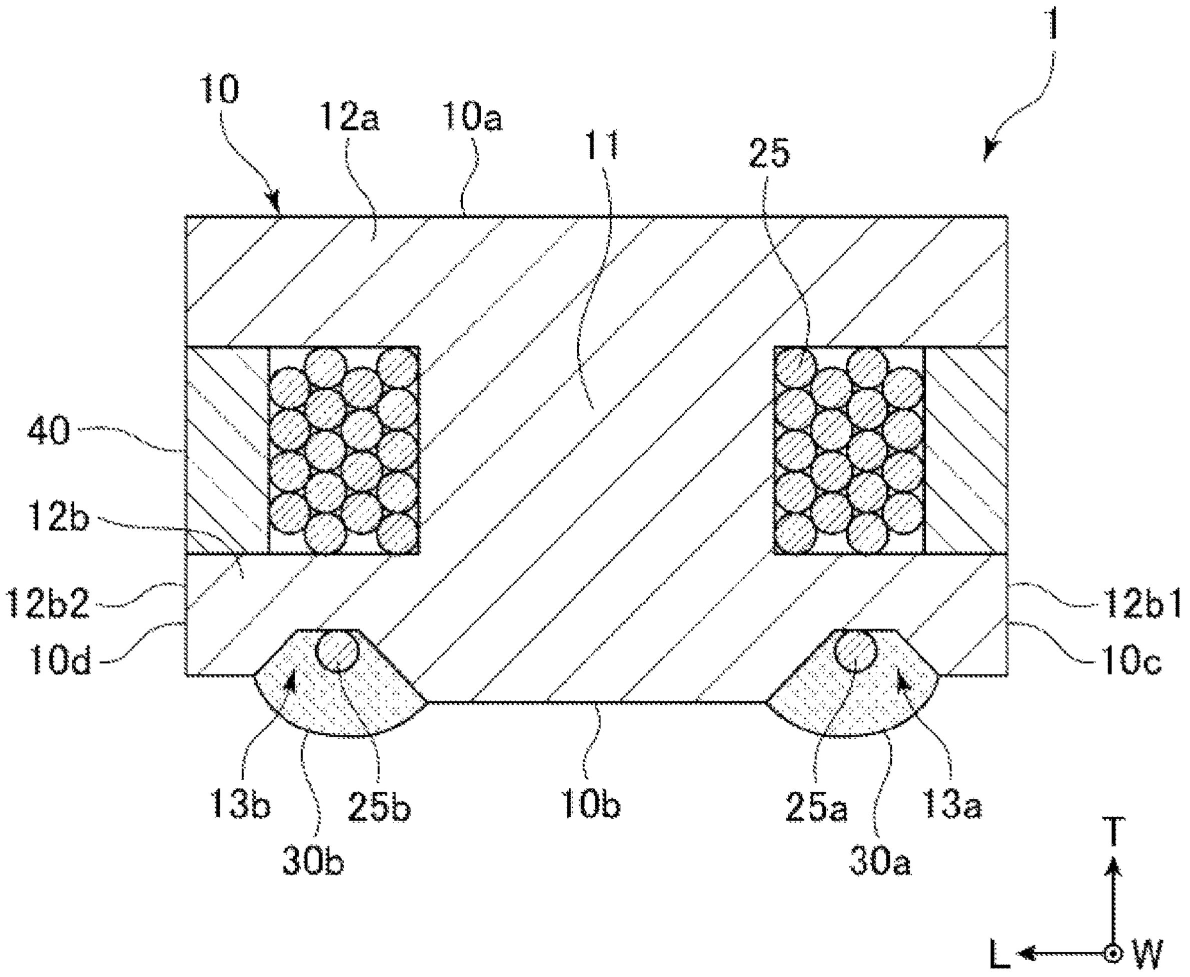
FIG. 3 is a sectional view of the coil component along the line I-I in FIG. 2.
Figure 4:
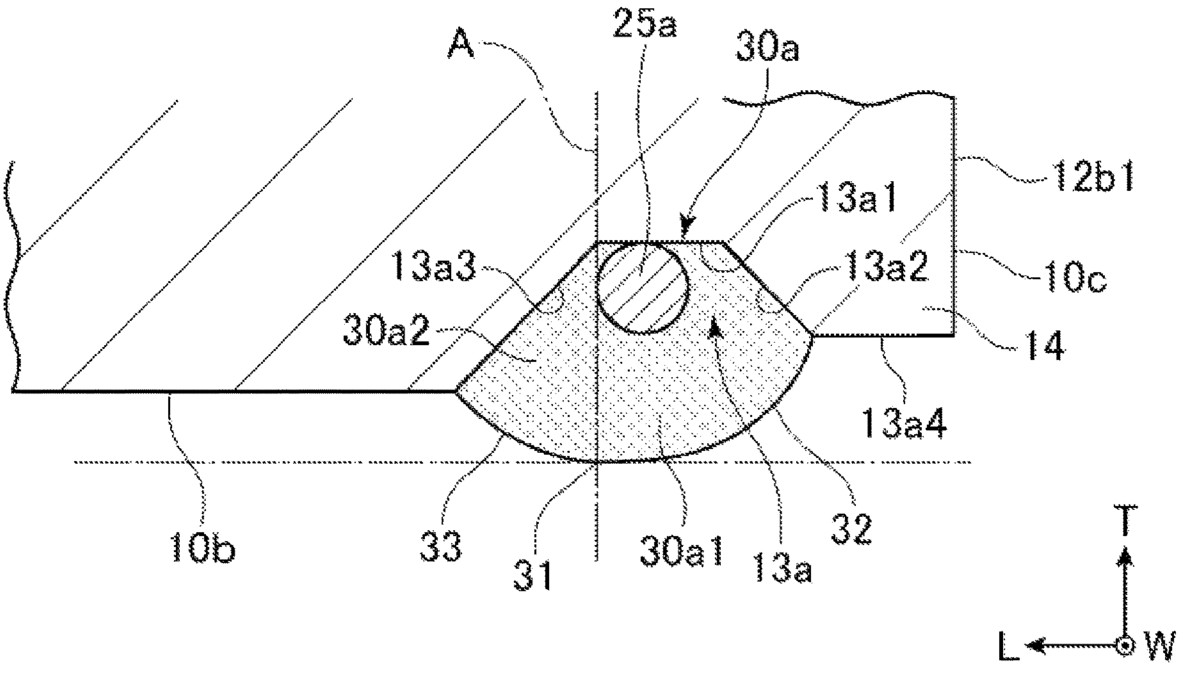
FIG. 4 is an enlarged sectional view illustrating a part of the section in FIG. 2 in an enlarged manner.

Referring to FIGS. 1 to 4, a coil component 1 according to an embodiment of the present invention will be described. FIG. 1 is a vertical sectional view of the coil component 1 mounted on a mounting board 2*a*, FIG. 2 is a perspective view of the coil component 1 before the coil component 1 is mounted on the mounting board 2*a*, FIG. 3 is a sectional view of the coil component 1 in FIG. 2 cut along the cut line I-I, and FIG. 4 is an enlarged sectional view illustrating, in an enlarged manner, a part of the section illustrated in FIG. 3.

The coil component 1 is an inductor used to remove noise in an electronic circuit, for example. The coil component 1 may be a power inductor incorporated in a power source line or may be an inductor used in a signal line.

In each of FIGS. 1 to 4, a W axis, an L axis, and a Z axis that perpendicularly intersect each other are illustrated. In the specification, the "length" direction, the "width" direction, and the "thickness" direction of the coil component 1 will be defined as the "L-axis" direction, the "W-axis" direction, and the "T-axis" direction in FIG. 1, respectively. In the specification, orientations and disposition of constituting members of the coil component 1 will be described with reference to the L-axis direction, the W-axis direction, and the Z-axis direction.

As illustrated in FIG. 1, the coil component 1 is mounted on the mounting board 2*a*. As illustrated in FIGS. 1 and 3, the coil component 1 includes a core 10 formed of a magnetic material, a conductive wire 25 provided at the core 10, a solder joining portion 130*a*, a solder joining portion 130*b*, and an exterior portion 40. The coil component 1 is joined to a land 3*a* and a land 3*b* of the mounting board 2*a* through the solder joining portions 130*a* and 130*b*, respectively. The solder joining portions 130*a* and 130*b* are formed by solder portions 30*a* and 30*b* in the coil component 1 before mounting being melted and solidified at the time of the mounting, respectively. The solder portions 30*a* and 30*b* will be described later. It is desirable that the solder joining portion 130*a* and 130*b* have fillet with appropriate amounts and shapes such that the coil component 1 is stably joined to the mounting board 2*a*. A gap G is present between the land 3*a* and the land 3*b*. The gap G is defined by end surfaces of the land 3*a* and the solder joining portion 130*a* in a positive direction of the L axis, end surfaces of the land 3*b* and the solder joining portion 130*b* in a negative direction of the L axis, and a part of a mounting surface 10*b* of the core 10, which will be described later. The conductive wire 25 may be electrically connected to the land 3*a* via the solder joining portion 130*a* or may be in direct contact with the land 3*a*. Similarly, the conductive wire 25 may be electrically connected to the land 3*b* via the solder joining portion 130*b* or may be in direct contact with the land 3*b*.

The core 10 includes a winding core 11 extending in the T-axis direction, a flange 12*a* with a rectangular parallelepiped shape provided at one end portion of the winding core 11, and a flange 12*b* with a rectangular parallelepiped shape provided at the other end portion of the winding core 11. The winding core 11 couples the flange 12*a* to the flange 12*b*. The winding core 11 has a columnar shape. The winding core 11 can have an arbitrary shape around which the conductive wire is suitably wound. For example, the winding core 11 can have a polygonal prism shape such as a triangular prism shape, a pentagonal prism shape, or a hexagonal prism shape, a circular pillar shape, an elliptical pillar shape, or a truncated cone shape. The shapes of the winding core 11 and the flanges 12*a* and 12*b* are not limited to those specifically disclosed in the specification.

The core 10 is produced from a magnetic material or a mixed material including a magnetic material. As an example of the magnetic material for the core 10, a ferrite material is used. In other words, the core 10 may be a ferrite sintered body obtained by sintering ferrite powder. As a ferrite material for the core 10, an Ni—Zn-based or Mn—Zn-based ferrite material can be used. The core 10 may be formed by bonding metal magnetic particles made of a soft magnetic metal material. The plurality of metal magnetic particles may be bonded to each other with insulating films formed on surfaces thereof or may be bonded with a binder made of a thermosetting resin with excellent insulating properties, such as an epoxy resin. The core 10 can be produced by various manufacturing methods from various materials in a common procedure.

As illustrated in FIG. 2, the core 10 includes a first main surface 10*a*, a second main surface 10*b*, a first end surface 10*c*, a second end surface 10*d*, a first side surface 10*e*, and a second side surface 10*f*. As illustrated in the drawing, since the coil component 1 is mounted on the mounting board 2*a* with the first main surface 10*a* facing upward, the first main surface 10*a* may be referred to as an "upper surface" or an "upper surface 10*a*". Also, since the second main surface 10*b* is disposed to face the mounting board 2*a*, the second main surface 10*b* may be referred to as a "mounting surface" or a "mounting surface 10*b*". The first end surface 10*c* and the second end surface 10*d* face each other. The upper surface 10*a*, the mounting surface 10*b*, the first end surface 10*c*, the second end surface 10*d*, the first side surface 10*e*, and the second side surface 10*f* of the core 10 are configured with the surfaces of the flange 12*a* and the flange 12*b* as will be described below.

The flange 12*a* includes a first end surface 12*a*1, a second end surface 12*a*2 facing the first end surface 12*a*1, an upper surface 12*a*3 connecting the first end surface 12*a*1 to the second end surface 12*a*2 and facing upward at the time of mounting, and a lower surface 12*a*4 facing the upper surface

12*a*3, a first side surface 12*a*5 connecting the first end surface 12*a*1 to the second end surface 12*a*2 and connecting the upper surface 12*a*3 to the lower surface 12*a*4, and a second side surface 12*a*6 facing the first side surface 12*a*5. The flange 12*b* includes a first end surface 12*b*1, a second end surface 12*b*2 facing the first end surface 12*b*1, a lower surface 12*b*3 facing downward at the time of the mounting, an upper surface 12*b*4 facing the lower surface 12*b*3, a first side surface 12*b*5 connecting the first end surface 12*b*1 to the second end surface 12*b*2 and connecting the lower surface 12*b*3 to the upper surface 12*b*4, and a second side surface 12*b*6 facing the first side surface 12*b*5. The upper surface 12*a*3 of the flange 12*a* conforms to the upper surface 10*a* of the core 10, and the lower surface 12*b*3 of the flange 12*b* conforms to the mounting surface 10*b* of the core 10. The first end surface 12*a*1 of the flange 12*a* and the first end surface 12*b*1 of the flange 12*b* configure the first end surface 10*c* of the core 10, and the second end surface 12*a*2 of the flange 12*a* and the second end surface 12*b*2 of the flange 12*b* configure the second end surface 10*d* of the core 10. The first side surface 12*a*5 of the flange 12*a* and the first side surface 12*b*5 of the flange 12*b* configure the first side surface 10*e* of the core 10, and the second side surface 12*a*6 of the flange 12*a* and the second side surface 12*b*6 of the flange 12*b* configure the second side surface 10*f* of the core 10. The flange 12*a* and the flange 12*b* may have mutually the same shape or may have mutually different shapes. In a case in which the flange 12*a* and the flange 12*b* do not have the same shape, the first end surface 12*b*1 of the flange 12*b* including the first recessed portion 13*a* and the second recessed portion 13*b* is defined as the first end surface 10*c* of the core 10, the second end surface 12*b*2 of the flange 12*b* is defined as the second end surface 10*d* of the core 10, the first side surface 12*b*5 of the flange 12*b* is defined as the first side surface 10*e* of the core 10, and the second side surface 12*b*6 of the flange 12*b* is defined as the second side surface 10*f* of the core 10.

The first recessed portion 13*a* is provided between the mounting surface 10*b* and the first end surface 10*c* of the core 10, and the second recessed portion 13*b* is provided between the mounting surface 10*b* and the second end surface 10*d* of the core 10. In other words, the first recessed portion 13*a* connects one end of the mounting surface 10*b* in the L-axis direction to the lower end of the first end surface 10*c* in the T-axis direction, and the second recessed portion 13*b* connects the other end of the mounting surface 10*b* in the L-axis direction to the lower end of the second end surface 10*d* in the T-axis direction. In this manner, the mounting surface 10*b* extends from the one end to the other end along the L-axis direction, has the one end connected to the first recessed portion 13*a*, and has the other end connected to the second recessed portion 13*b*. In the embodiment illustrated in FIG. 2, the first recessed portion 13*a* and the second recessed portion 13*b* extend along the W-axis direction between the mounting surface 10*b* and the first end surface 10*c* and between the mounting surface 10*b* and the second end surface 10*d*, respectively. In the illustrated embodiment, each of the first recessed portion 13*a* and the second recessed portion 13*b* extends from the first side surface 10*e* to the second side surface 10*f*. A part of the mounting surface 10*b* and a part of the first end surface 10*c* may be in direct contact with each other, and a part of the mounting surface 10*b* and a part of the second end surface 10*d* may be in direct contact with each other. Hereinafter, the first recessed portion 13*a* will be mainly described with reference to FIG. 4. Description related to the first recessed portion 13*a* will be incorporated herein as description of the second recessed portion 13*b*.

As illustrated in FIG. 4, the first recessed portion 13*a* is defined by a recessed portion surface that occupies a part of the surface of the core 10. The recessed portion surface includes a bottom surface 13*a*1 located on the further inner side (the positive side in the T-axis direction) of the core 10 beyond the mounting surface 10*b*, a first inclined surface 13*a*2 extending from the bottom surface 13*a*1 toward the first end surface 10*c* with an inclination relative to the T axis, a second inclined surface 13*a*3 extending from the bottom surface 13*a*1 toward the side opposite to the first end surface 10*c* with an inclination relative to the T axis, and a connecting surface 13*a*4 connecting the lower end of the first inclined surface 13*a*2 to the first end surface 10*c*. The bottom surface 13*a*1 may be parallel to the mounting surface 10*b* or may be inclined with respect to the mounting surface 10*b*. The connecting surface 13*a*4 may be parallel to the mounting surface 10*b* or may be inclined with respect to the mounting surface 10*b*. The connecting surface 13*a*4 is disposed between the bottom surface 13*a*1 and the first end surface 10*c* in the L-axis direction and is disposed between the bottom surface 13*a*1 and the bottom surface of the mounting surface 10*b* in the T-axis direction. A raised portion 14 is formed between the bottom surface 13*a*1 of the first recessed portion 13*a* and the first recessed portion 13*a* of the core 10. The raised portion 14 has an outer edge defined by the first inclined surface 13*a*2, the connecting surface 13*a*4, and a part of the first end surface 10*c* in a section cut along a plane that perpendicularly intersects the mounting surface 10*b* and is parallel to the length direction. The plane that perpendicularly intersects the mounting surface 10*b* and is parallel to the length direction may be a plane that perpendicularly intersects the mounting surface 10*b* and is perpendicular to the first end surface 10*c*. Throughout the specification, the plane that perpendicularly intersects the mounting surface 10*b* and is parallel to the length direction can be interchangeable with the plane that perpendicularly intersects the mounting surface 10*b* and is perpendicular to the first end surface 10*c*. Each of the bottom surface 13*a*1, the first inclined surface 13*a*2, the second inclined surface 13*a*3, and the connecting surface 13*a*4 may be provided with a metal film, which is not illustrated. The metal film may include an underlayer made of a metal material such as copper, silver, palladium, or a silver-palladium alloy and a plated layer provided on the underlayer. The plated layer may include a nickel plated layer and a tin plated layer.

The conductive wire 25 is wound around the winding core 11. The conductive wire 25 is configured by covering the surroundings of a metal wire made of a metal material with excellent conductivity with an insulating coating, for example. As the metal material for the conductive wire 25, one or more kinds of metal selected from Cu, Al, Ni, and Ag or an alloy containing any of these kinds of metal can be used, for example. The insulating coating provided in the surroundings of the conductive wire is configured with polyesterimide, polyamide, or another insulating material with excellent insulating properties, for example. One end 25*a* of the conductive wire 25 is drawn into the first recessed portion 13*a* while the other end 25*b* of the conductive wire 25 is drawn into the second recessed portion 13*b*. The conductive wire 25 may be provided with the one end 25*a* in contact with the bottom surface 13*a*1 of the first recessed portion 13*a* and with the other end 25*b* in contact with the bottom surface (a sign is omitted) of the second recessed portion 13*b*. In a case in which the one end 25*a* of the conductive wire 25 is separated from the bottom surface 13*a*1 of the first recessed portion 13*a* or in a case in which the other end 25*b* is separated from the bottom surface (a sign is omitted) of the second recessed portion 13*b*, the dimensions of the first recessed portion 13*a* and the second recessed portion 13*b* in the T-axis direction increase. In order to maintain mechanical strength of the flange 12*b* even when the dimensions of the first recessed portion 13*a* and the second recessed portion 13*b* in the T-axis direction increase, it is necessary to increase the dimension of the flange 12*b* in the T-axis direction. It is possible to avoid an increase in dimension of the flange 12*b* in the T-axis direction and thereby to keep the dimension of the coil component 1 in the T-axis direction small by disposing the conductive wire 25 with the one end 25*a* of the conductive wire 25 in contact with the bottom surface 13*a*1 of the first recessed portion 13*a* and with the other end 25*b* in contact with the bottom surface (a sign is omitted) of the second recessed portion 13*b*.

In the illustrated embodiment, the sectional shape of the conductive wire 25 is a circular shape. The sectional shape of the conductive wire 25 is not limited to the circular shape and may be an elliptical shape, an oval shape, a rectangular shape, or a square shape. The diameter of the conductive wire 25 may be smaller than the interval between the mounting surface 10*b* and the bottom surface 13*a*1 of the recessed portion 13*a*. In this manner, the conductive wire 25 is disposed such that the one end 25*a* is located within the first recessed portion 13*a* without projecting from the mounting surface 10*b* to the outside and the other end 25*b* is located within the second recessed portion 13*b* without projecting from the mounting surface 10*b* to the outer side. It is possible to support the coil component 1 with the lands 3*a* and 3*b* not at the one end 25*a* and the other end 25*b* of the conductive wire 25 but at the flat mounting surface 10*b* by setting the diameter of the conductive wire 25 to be smaller than the interval between the mounting surface 10*b* and the bottom surface 13*a*1 of the recessed portion 13*a*, and it is thus possible to prevent the coil component 1 from being unexpectedly inclined with respect to the mounting board 2*a*.

The solder portion 30*a* is provided inside the first recessed portion 13*a* to be electrically connected to the one end 25*a* of the conductive wire 25. The solder portion 30*a* can be produced by causing molten solder generated by heating a solder paste, with which the first recessed portion 13*a* is filled, to wet-spread to the first recessed portion 13*a* and by solidifying the wet-spread molten solder. In one or more embodiments of the present invention, the insulating coating that covers the conducive wire 25 is removed from the conductive wire 25 when the first recessed portion 13*a* is filled with the solder. The insulating coating that covers the conductive wire 25 may be thermally decomposed by coming into contact with the molten solder generated by the solder portion 30*a* being melted at the time of the mounting, and as a result, the insulating coating may be removed from the conductive wire 25. The solder paste is made of an arbitrary solder material. As the solder material, it is possible to use a zinc-free alloy material defined by JIS Z 3282, for example. The solder paste can be applied to the inside of the first recessed portion 13*a* by a stencil printing method, for example. The solder portion 30*a* may be formed by dipping the core 10 into a solder bath. The solder portion 30*a* may be formed by fitting a molded article of the solder material, which is obtained by molding the solder material using a mold, along with the one end 25*a* of the conductive wire 25 into the first recessed portion 13*a* and heating the molded article of the solder material fitted into the first recessed portion 13*a*. The specific method for forming the solder portion 30*a* is not limited to that explicitly disclosed in the specification. The solder portion 30*b* is provided inside the second recessed portion 13*b* to be electrically connected to the other end 25*b* of the conductive wire 25 similarly to the solder portion 30*a*. The solder portion 30*a* is unlikely to drop off from the core 10 since movement on the outer side (on the negative side in the L-axis direction) is restricted by the raised portion 14. Movement of the solder portion 30*b* on the outer side may also be restricted by a raised portion that is equivalent to the raised portion 14.

The exterior portion 40 is formed by filling a portion between the flange 12*a* and the flange 12*b* with an insulating resin. As the resin material for the exterior portion 40, a resin material with excellent insulating properties such as an epoxy resin can be used. A part or an entire of the region between the flange 12*a* and the flange 12*b* is filled with the exterior portion 40. The exterior portion 40 may contain a filler. As the filler, it is possible to use a magnetic material or a non-magnetic material. It is possible to reduce a linear expansion coefficient of the exterior portion 40 and to enhance mechanical strength by using ferrite powder, metal magnetic particles, alumina particles, or silica particles as the filler.

As is clearly illustrated in FIG. 4, the solder portion 30*a* has a peak 31 projecting from the mounting surface 10*b* toward the outer side (that is, the negative side of the T axis) of the core 10. In other words, the peak 31 projects from the mounting surface 10*b* toward the negative side of the T axis in a section obtained by cutting the solder portion 30*a* along the plane that perpendicularly intersects the mounting surface 10*b* and is parallel with the length direction (the LT plane in the illustrated embodiment). The peak 31 indicates a site of the solder portion 30*a* with the longest distance from the plane passing through the mounting surface 10*b* in the cut section obtained by cutting the solder portion 30*a* along the plane that perpendicularly intersects the mounting surface 10*b* and is parallel with the length direction. The distance between each part of the solder portion 30*a* and the plane passing through the mounting surface 10*b* means the length of a perpendicular line drawn from each part of the solder portion 30*a* to the plane passing through the mounting surface 10*b*. The peak 31 may be located closer to the second end surface 10*d* (that is, the positive side in the L-axis direction) than the center of the one end 25*a* of the conductive wire 25 in the section cut along the plane that perpendicularly intersects the mounting surface 10*b* and is parallel with the length direction.

The solder portion 30*a* is sectioned into an outer region 30*a*1 located closer to the first end surface 10*c* than the peak 31 in the length direction (L-axis direction) and an inner region 30*a*2 located farther from the first end surface 10*c* than the peak 31 in the length direction. In other words, the outer region 30*a*1 is located on the side of the first end surface 10*c* beyond the peak 31 in the length direction while the inner region 30*a*2 is located on the side opposite to the first end surface 10*c* (the side of the second end surface 10*d*) beyond the peak 31 in the length direction. A perpendicular line A drawn from the peak 31 to the plane passing through the mounting surface 10*b* in a sectional view of the section along the plane that is perpendicular to the mounting surface 10*b* and is perpendicular to the first end surface 10*c* corresponds to a boundary between the outer region 30*a*1 and the inner region 30*a*2. In one or more embodiments of the present invention, the solder portion 30*a* is configured such that the volume of the outer region 30*a*1 is larger than the volume of the inner region 30*a*2. How large or small the volume of the outer region 30*a*1 and the volume of the inner region 30*a*2 are can be determined by comparing the area of the outer region 30*a*1 with the area of the inner region 30*a*2 in the section cut along the plane that perpendicularly intersects the mounting surface 10*b* and is parallel with the length direction. Specifically, in a case in which the area of the outer region 30*a*1 is larger than the area of the inner region 30*a*2 in the section cut along the plane that perpendicularly intersects the mounting surface 10*b* and is parallel with the length direction, it is possible to determine that the volume of the outer region 30*a*1 is larger than the volume of the inner region 30*a*2. In a case in which the position of the peak 31 in the L axis direction in the section cut along the plane that perpendicularly intersects the mounting surface 10*b* and is parallel with the length direction varies depending on the position in the width direction (W-axis direction) in the section, how large or small the volume of the outer region 30*a*1 and the volume of the inner region 30*a*2 are can be determined by cutting the solder portion 30*a* along LT planes passing through a plurality of points (three points or five points, for example) dispersed at equal intervals in the W-axis direction and comparing how large or small the total area of the outer region 30*a*1 and the total area of the inner region 30*a*2 are in the plurality of sections.

The surface of the solder portion 30*a* is sectioned into a surface 32 of the outer region 30*a*1 and a surface 33 of the inner region 30*a*2 from a viewpoint seen from the negative side of the T axis. In other words, a region of the surface of the solder portion 30*a* that can be seen when the coil component 1 is seen from the negative side of the T axis (that is, a region of the surface of the solder portion 30*a* that is connected to the mounting surface 10*b*) is sectioned into two regions by the peak 31. One of the regions sectioned by the peak 31 is the surface 32 of the outer region 30*a*1, and the other region is sectioned as the surface 33 of the inner region 30*a*2. In one or more embodiments of the present invention, the solder portion 30*a* is configured such that the surface area of the surface 32 of the outer region 30*a*1 is larger than the surface area of the surface 33 of the inner region 30*a*2. How large or small the surface area of the surface 32 of the outer region 30*a*1 and the surface area of the surface 33 of the inner region 30*a*2 are can be determined by comparing the length of the surface 32 of the outer region 30*a*1 with the length of the surface 33 of the inner region 30*a*2 in the section cut along the plane that perpendicularly intersects the mounting surface 10*b* and is parallel with the length direction. In a case in which the position of the peak 31 in the L-axis direction in the section cut along the plane that perpendicularly intersects the mounting surface 10*b* and is parallel with the length direction varies depending on the position in the width direction (W-axis direction) in the section, how large or small the surface area of the surface 32 of the outer region 30*a*1 and the surface area of the surface 33 of the inner region 30*a*2 are may be determined by cutting the solder portion 30*a* along LT planes passing through a plurality of points (for example, three points or five points) dispersed at equal intervals in the W-axis direction and comparing how large or small the total length of the surface 32 of the outer region 30*a*1 and the total length of the surface 33 of the inner region 30*a*2 are in the plurality of sections.

When the coil component 1 is mounted on the mounting board 2*a*, the molten solder generated by the outer region 30*a*1 on the side of the first end surface 10*c* beyond the peak 31 in the solder portion 30*a* being melted is likely to wet-spread toward the first end surface 10*c* along the surface 32 of the outer region 30*a*1, and the molten solder generated by the inner region 30*a*2 on the side of the second end surface 10*d* beyond the peak 31 being melted is likely to wet-spread toward the side of the second end surface 10*d* (the side opposite to the first end surface 10*c*) along the surface of the inner region 30*a*2. Since the solder portion 30*a* is configured such that the volume of the outer region 30*a*1 is larger than the volume of the inner region 30*a*2, it is possible to cause a sufficient amount of molten solder to wet-spread toward the first end surface 10*c* at the time of mounting. In this manner, fillet is likely to be formed at the first end surface 10*c* in the coil component 1 mounted on the mounting board 2*a*. In other words, fillet of an appropriate amount and shape is likely to be formed as a part of the solder joining portion 130*a*.

As illustrated in FIG. 4, the entire solder portion 30*a* is disposed inside the core 10 beyond the first end surface 10*c* in one or more embodiments of the present invention. In other words, in the length direction, the peak 31 is located on the side of the other end of the first end surface 10*c* beyond the center of the solder portion 30*a* in the length direction. The entire solder portion 30*a* is provided on the side of the second end surface 10*d* beyond the first end surface 10*c* in the L-axis direction. The solder portion 30*a* does not project from the first end surface 10*c* to the outer side. If the solder portion 30*a* projects outward beyond the first end surface 10*c*, there is a probability that it is not possible to identify which of a part of the solder portion 30*a* provided at the first end surface 10*c* before the mounting or a part of the solder portion 30*a* formed by the molten solder wet-spreading to the first end surface 10*c* at the time of the mounting the solder adhering to the first end surface 10*c* after the mounting is. Therefore, if the solder portion 30*a* projects outward from the first end surface 10*c*, there is a concern that error determination that satisfactory joint has been achieved may be made although the molten solder has not wet-spread to the first end surface 10*c*. In the embodiment illustrated in FIG. 4, the entire solder portion 30*a* is located on the side of the second end surface 10*d* beyond the first end surface 10*c*, the first end surface 10*c* is not provided with the solder portion 30 before the mounting, and it is thus possible to prevent the error determination in inspection regarding whether or not satisfactory joint has been achieved by the solder that is present in the first end surface 10*c* before the mounting.

Figure 5:
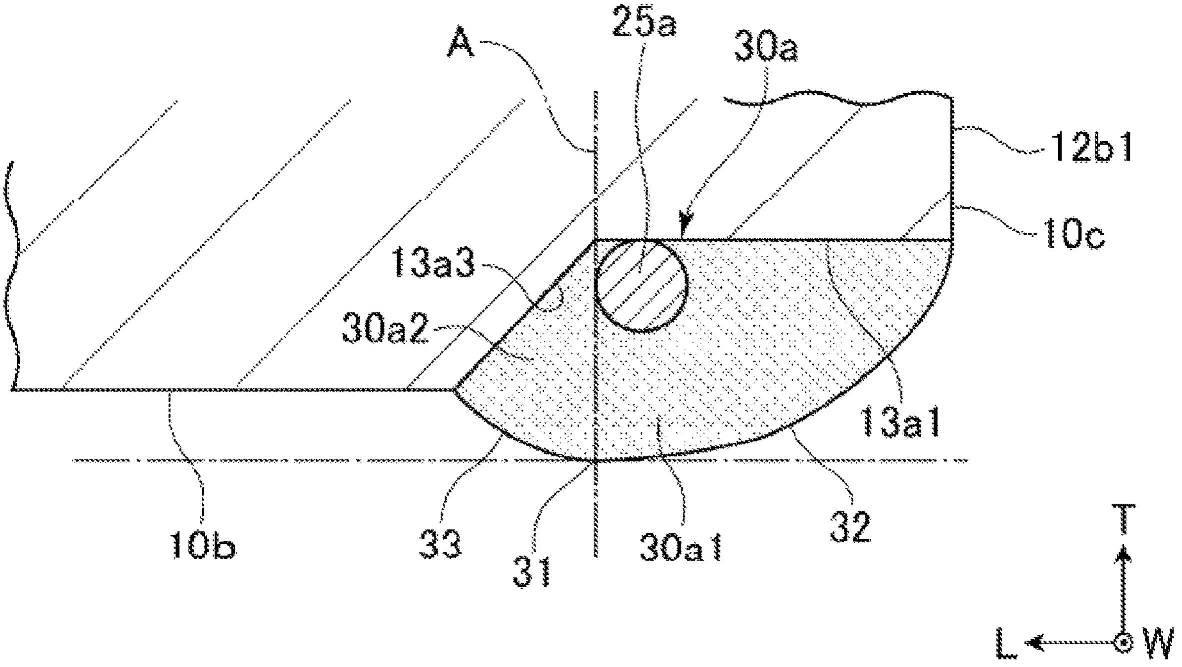
FIG. 5 is an enlarged sectional view illustrating, in an enlarged manner, a part of the section of the coil component along the line I-I according to an embodiment of the present invention.

The first recessed portion 13*a* and the solder portion 30*a* can be formed into various shapes. Modifications of the first recessed portion 13*a* and the solder portion 30*a* will be described with reference to FIGS. 5 to 7. FIG. 5 is an enlarged sectional view illustrating an example of a modification of the first recessed portion 13*a* and the solder portion 30*a* illustrated in FIG. 4. The embodiment illustrated in FIG. 5 is different from the embodiment illustrated in FIG. 4 in that the bottom surface 13*a*1 of the first recessed portion 13*a* is connected directly to the first end surface 10*c*. In the embodiment illustrated in FIG. 5, the recessed portion surface that defines the first recessed portion 13*a* includes a bottom surface 13*a*1 and a second inclined surface 13*a*3. The solder portion 30*a* extends from a position at which the mounting surface 10*b* is connected to the second inclined surface 13*a*3 to a position at which the bottom surface 13*a*1 is connected to the first end surface 10*c* in the section cut along the plane that perpendicularly intersects the mounting surface 10*b* and is parallel with the length direction. In the embodiment illustrated in FIG. 5, an end of the solder portion 30*a* on the negative side in the L-axis direction is disposed at the connecting position between the bottom surface 13_a_1 and the first end surface 10_c_. The position of the end of the solder portion 30_a_ on the negative side in the L-axis direction is not limited to the illustrated position and can be disposed at an arbitrary position in the bottom surface 13_a_1 as long as the condition that the volume of the outer region 30_a_1 is larger than the volume of the inner region 30_a_2 is satisfied. Also, the solder portion 30_a_ may cover a part of the first end surface 10_c_. In such an embodiment, no bump is present between the bottom surface 13_a_1 and the first end surface 10_c_, and the molten solder generated by the solder portion 30_a_ being melted is thus likely to wet-spread to the first end surface 10_c_ at the time of the mounting. In the case in which the solder portion 30_a_ covers at least a part of the first end surface 10_c_, in particular, it is possible to reliably cause the molten solder generated by the solder portion 30_a_ being melted to wet-spread to the first end surface 10_c_ at the time of the mounting. In this manner, the formation of the solder fillet on the first end surface 10_c_ is further facilitated. In a case in which the solder portion 30_a_ does not cover the first end surface 10_c_, it is possible to prevent error determination in the inspection regarding whether or not satisfactory joint has been achieved by the solder that is present in the first end surface 10_c_ before the mounting.

Figure 6:
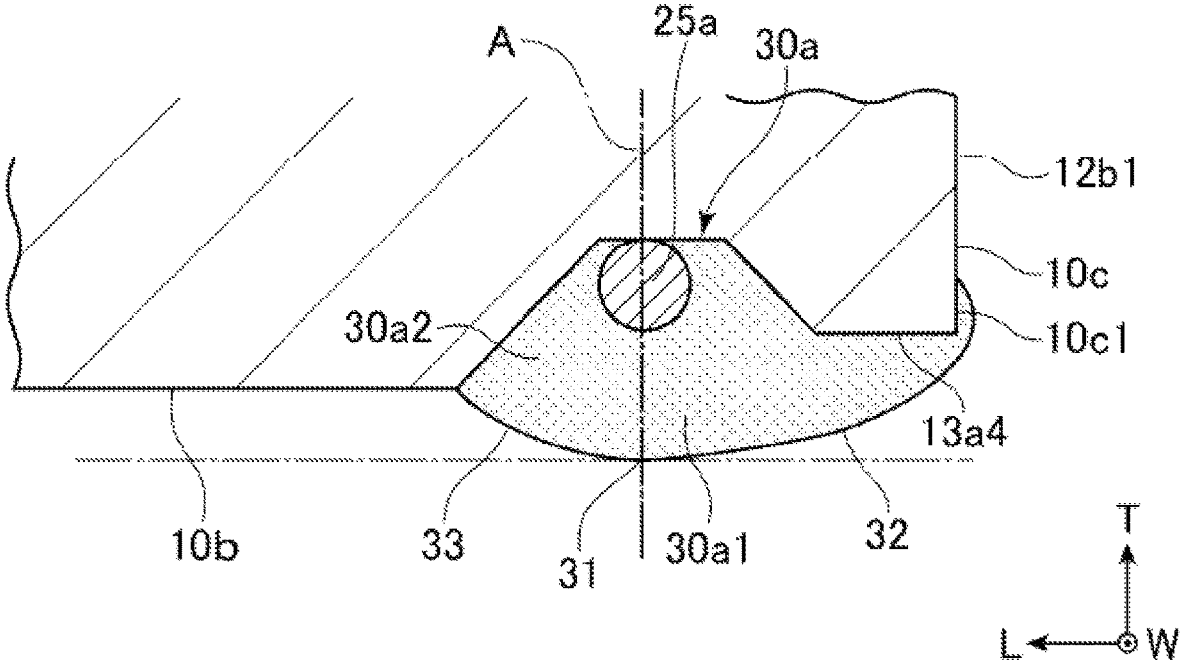
FIG. 6 is an enlarged sectional view illustrating, in an enlarged manner, a part of the section of the coil component along the line I-I according to an embodiment of the present invention.

FIG. 6 is an enlarged sectional view illustrating another modification of the first recessed portion 13_a_ and the solder portion 30_a_ illustrated in FIG. 4. In the embodiment illustrated in FIG. 6, the solder portion 30_a_ is disposed such that a part of the solder portion 30_a_ covers a part of the first end surface 10_c_. More specifically, the solder portion 30_a_ covers a connecting region 10_c_1 in the first end surface 10_c_ that is continuous with the mounting surface 10_b_. Regions other than the connecting region 10_c_1 in the first end surface 10_c_ are not covered with the solder portion 30_a_. According to the embodiment illustrated in FIG. 6, the part of the solder portion 30_a_ is provided to cover the connecting region 10_c_1 of the first end surface 10_c_ before the mounting, and the molten solder generated by the solder portion 30_a_ being melted is thus further likely to wet-spread to the first end surface 10_c_ at the time of the mounting. In this manner, the formation of the solder fillet on the first end surface 10_c_ is further facilitated. It is desirable that the thickness of the portion of the solder portion 30_a_ provided at the first end surface 10_c_ in the L-axis direction be thin to such an extent that no error determination occurs in the determination regarding whether or not satisfactory joint has been achieved. In the case in which the solder portion 30_a_ covers the first end surface 10_c_, the solder portion 30_a_ is provided such that the portion covering the first end surface 10_c_ is not in contact with the exterior portion 40. An end of the portion of the solder portion 30_a_ covering the first end surface 10_c_ on the positive side in the T-axis direction is located at any position, in the T-axis direction, between the connecting surface 13_a_4 and the end of the exterior portion 40 on the negative side in the T-axis direction. If the molten solder generated by the solder portion 30_a_ being melted wet-spreads to the exterior portion 40 at the time of the mounting, there is a concern that the exterior portion 40 is heated by the molten solder, and the insulating properties of the resin contained in the exterior portion 40 is degraded, or a thermal stress acts on the exterior portion 40, and adhesiveness between the exterior portion 40 and the core 10 is degraded. It is possible to curb contact of the molten solder with the exterior portion 40 by preventing the part of the solder portion 30_a_ covering the first end surface 10_c_ from coming into contact with the exterior portion 40.

Figure 7:
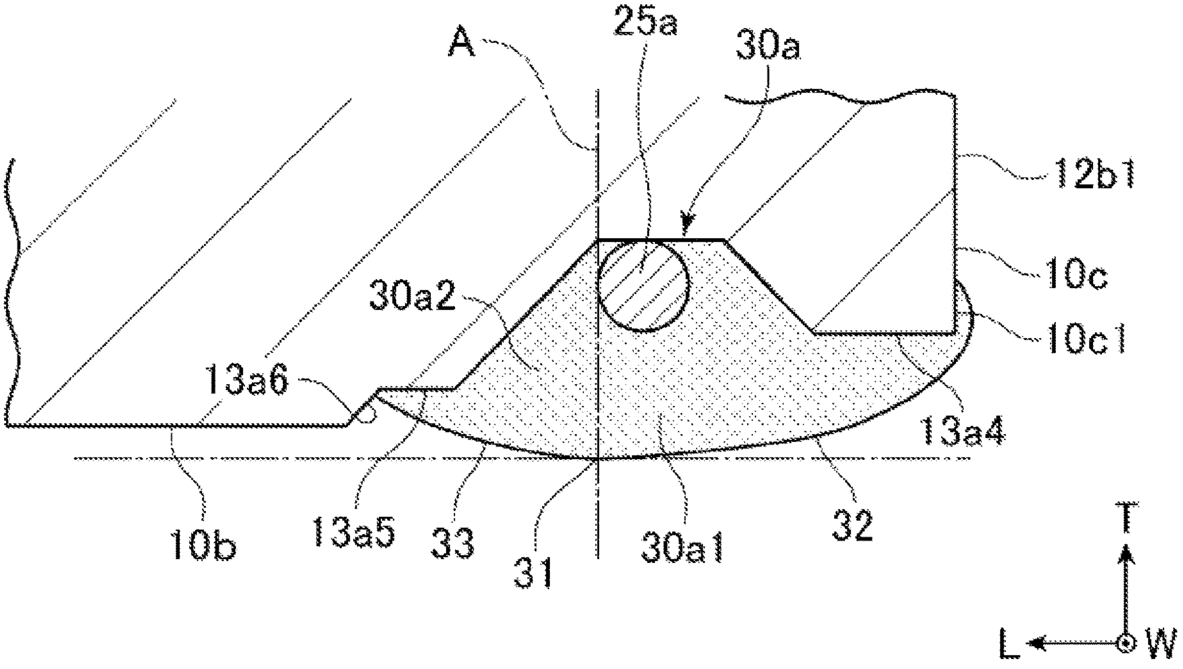
FIG. 7 is an enlarged sectional view illustrating, in an enlarged manner, a part of the section of the coil component along the line I-I according to an embodiment of the present invention.

FIG. 7 is an enlarged sectional view illustrating another modification of the first recessed portion 13_a_ and the solder portion 30_a_ illustrated in FIG. 6. In the embodiment illustrated in FIG. 7, the recessed portion surface that defines the first recessed portion 13_a_ includes, in addition to the bottom surface 13_a_1, the first inclined surface 13_a_2, the second inclined surface 13_a_3, and the connecting surface 13_a_4, an intermediate surface 13_a_5 extending from the lower end of the second inclined surface 13_a_3 in parallel with the mounting surface 10_b_ and a third inclined surface 13_a_6 connecting the intermediate surface 13_a_5 to the mounting surface 10_b_. It is possible to curb short-circuiting between terminal electrodes due to the molten solder by the intermediate surface 13_a_5 and the third inclined surface 13_a_6, which connects the intermediate surface 13_a_5 to the mounting surface 10_b_, limiting the amount of molten solder, which has been generated by the solder portion 30_a_ being melted, wet-spreading to the inside of the core 10 (the positive direction in the L-axis direction) at the time of the mounting. In this case, it is possible to shorten the interval between the first recessed portion 13_a_ and the second recessed portion 13_b_ and thereby to reduce the dimension of the coil component 1 in the L-axis direction.

The first recessed portion 13_a_ and the solder portion 30_a_ illustrated in FIGS. 4 to 7 are illustrative examples, and the shapes and the disposition of the first recessed portion 13_a_ and the solder portion 30_a_ are not limited to those explicitly described in the specification. For example, the recessed portion 13_a_ illustrated in FIG. 5 may include the third inclined surface 13_a_6 that connects the intermediate surface 13_a_5 to the mounting surface 10_b_.

As described above, the description related to the solder portion 30_a_ will be incorporated herein as description for the solder portion 30_b_. Also, the description related to the first recessed portion 13_a_ will be incorporated herein as description for the second recessed portion 13_b_. Therefore, both the solder portion 30_b_ and the second recessed portion 13_b_ may have the shapes and the disposition corresponding to the shapes and the disposition of the solder portion 30_a_ and the first recessed portion 13_a_ illustrated in FIGS. 5 to 7.

Next, the outer region 30_a_1 and the inner region 30_a_2 will be further described with reference to FIGS. 8 and 9. As described above, in the one or more embodiments of the present invention, the solder portion 30_a_ is configured such that the volume of the outer region 30_a_1 is larger than the volume of the inner region 30_a_2. The embodiment illustrated in FIG. 4 has been described on the assumption that the perpendicular line A drawn from the peak 31 to the plane passing through the mounting surface 10_b_ is defined as a boundary and the region outside the perpendicular line A (the region located at the location closer to the first end surface 10_c_ than the perpendicular line A) is defined as the outer region 30_a_1 while the region inside the perpendicular line A (the region located at the location farther from the first end surface 10_c_ than the perpendicular line A) is defined as the inner region 30_a_2 in the section cut along the plane that perpendicularly intersects the mounting surface 10_b_ and is parallel with the length direction. In the embodiment illustrated in FIGS. 8 and 9, the outer region 30_a_1 and the inner region 30_a_2 in the solder portion 30_a_ will be defined using a criterion that is different from that in the above description.

Figure 8:
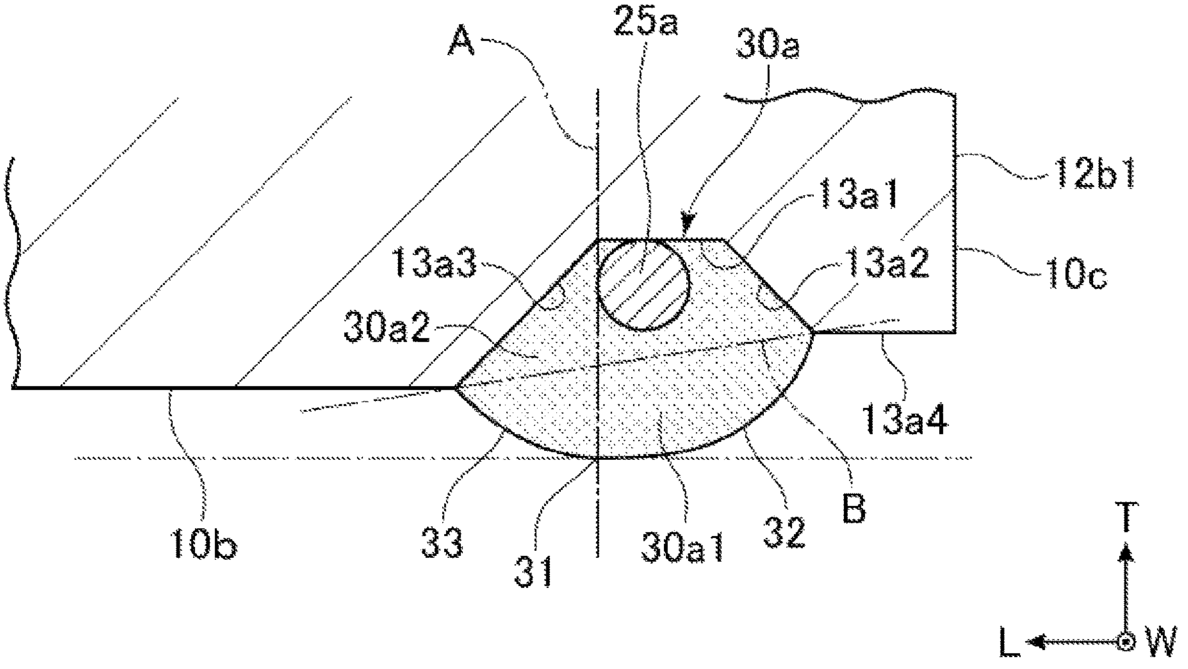
FIG. 8 is an explanatory diagram for explaining an outer region and an inner region of a solder portion according to an embodiment of the present invention.

Specifically, FIG. 8 illustrates a virtual line B connecting a connecting position between the mounting surface 10_b_ and the first recessed portion 13_a_ to a connecting position between the first inclined surface 13_a_2 and the connecting surface 13_a_4 in the section cut along the plane that perpendicularly intersects the mounting surface 10_b_ and is parallel with the length direction. In the embodiment illustrated in FIG. 8, the solder portion 30*a* is vertically sectioned by the virtual line B, and a region in the solder portion 30*a* outside the perpendicular line A and below the virtual line B is defined as the outer region 30*a*1 while a region in the solder portion 30*a* inside the perpendicular line A and below the virtual line B is defined as the inner region 30*a*2. In one or more embodiments of the present invention, the volume of the thus defined outer region 30*a*1 may be smaller than the volume of the inner region 30*a*2. A site of the solder portion 30*a* above the virtual line B is not likely to flow out from the first recessed portion 13*a* at the time of the mounting of the coil component 1 and is less related to the amount of solder wet-spreading to the first end surface 10*c*, and the volume of the outer region 30*a*1 and the volume of the inner region 30*a*2 below the virtual line B are thus compared in the embodiment in FIG. 8. In a case in which the first inclined surface 13*a*2 and the connecting surface 13*a*4 are not present (for example, a case in which the recessed portion surface has the shape illustrated in FIG. 5), the virtual line B can be a virtual line connecting a connecting position between the mounting surface 10*b* and the first recessed portion 13*a* to a connecting position between the bottom surface 13*a*1 and the first end surface 10*c*. How large or small the volume of the outer region 30*a*1 and the volume of the inner region 30*a*2 are can be determined by comparing how large or small the area of the outer region 30*a*1 and the area of the inner region 30*a*2 are in the section cut along the plane that perpendicularly intersects the mounting surface 10*b* and is parallel with the length direction.

Figure 9:
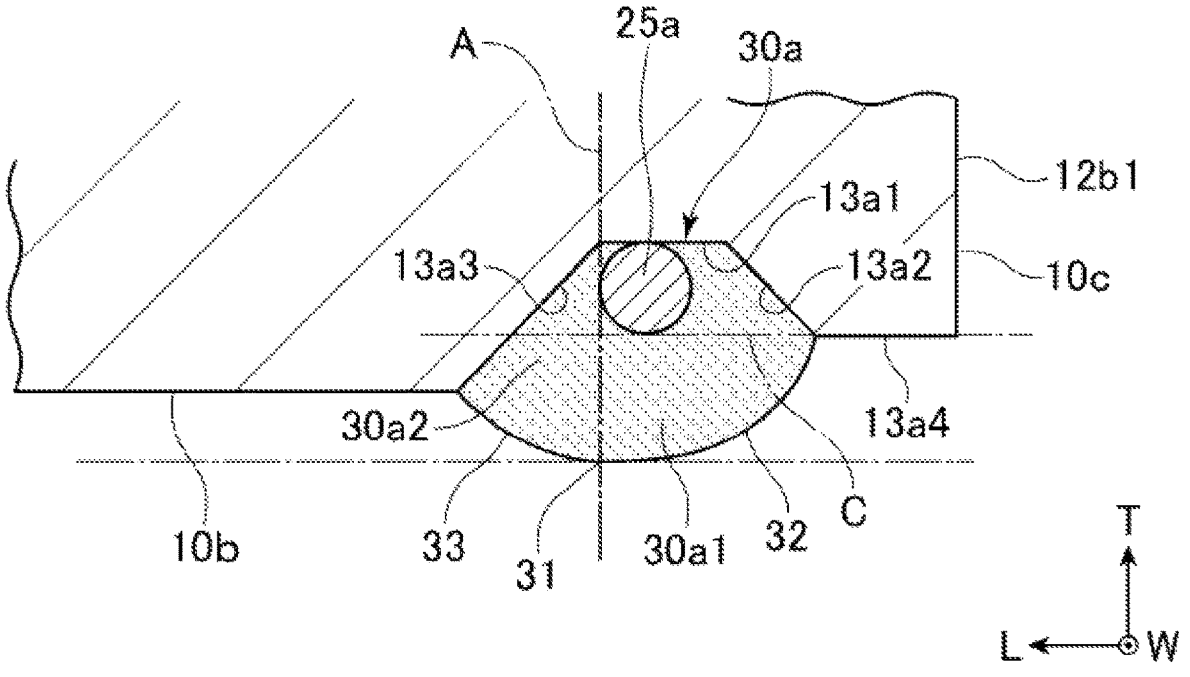
FIG. 9 is an explanatory diagram for explaining the outer region and the inner region of the solder portion according to an embodiment of the present invention.

FIG. 9 illustrates a virtual line C passing through the lower end of the one end 25*a* of the conductive wire 25 and extending in parallel with the mounting surface 10*b* in the section cut along the plane that perpendicularly intersects the mounting surface 10*b* and is parallel with the length direction. In the example illustrated in FIG. 9, the solder portion 30*a* is vertically sectioned by the virtual line C, a region in the solder portion 30*a* outside the perpendicular A and below the virtual line C is defined as the outer region 30*a*1, and a region in the solder portion 30*a* inside the perpendicular line A and below the virtual line C is defined as the inner region 30*a*2. In one or more embodiments of the present invention, the volume of the thus defined outer region 30*a*1 may be smaller than the volume of the inner region 30*a*2. The site of the solder portion 30*a* above the virtual line C is unlikely flow out from the first recessed portion 13*a* at the time of the mounting of the coil component 1 and is less related to the amount of solder wet-spreading to the first end surface 10*c*, and the volume of the outer region 30*a*1 and the volume of the inner region 30*a*2 below the virtual line C are thus compared in the embodiment in FIG. 9. How large or small the volume of the outer region 30*a*1 and the volume of the inner region 30*a*2 are can be determined by comparing how large or small the area of the outer region 30*a*1 and the area of the inner region 30*a*2 are in the section cut along the plane that perpendicularly intersects the mounting surface 10*b* and is parallel with the length direction.

Next, another illustrative method for manufacturing the coil component 1 according to an embodiment of the present invention will be described. First, the core 10 is produced. The core 10 can be produced by pressure-molding a composite magnetic material obtained by mixing metal magnetic particles and a resin with a molding die, for example. In a case in which the molding die has a mold core corresponding to the first recessed portion 13*a* and the second recessed portion 13*b*, the first recessed portion 13*a* and the second recessed portion 13*b* are formed in the pressure-molding process. In the pressure-molding process, a molded article in which the first recessed portion 13*a* and the second recessed portion 13*b* have not been formed may be molded, and the first recessed portion 13*a* and the second recessed portion 13*b* may be formed through grinding performed on a surface of the molded article corresponding to the mounting surface 10*b*. Metal films may be formed on the first recessed portion 13*a* and the second recessed portion 13*b*. The metal films may be formed by forming underlayers of copper or the like on the first recessed portion 13*a* and the second recessed portion 13*b* by a sputtering method and forming plated layers including nickel plated layers and tin plated layers on the underlayers.

Next, the conductive wire 25 is placed on the core 10. Specifically, the conductive wire 25 is wound around the winding core 11 of the core 10, the one end 25*a* of the conductive wire 25 is drawn to the first recessed portion 13*a*, and the other end 25*b* is drawn to the second recessed portion 13*b*. In a case in which the conductive wire 25 is configured by covering the surroundings of a metal wire with an insulating film, the insulating film is peeled off at the one end 25*a* and the other end 25*b* of the conductive wire 25, such that the metal wire is exposed from the conductive wire 25 inside the first recessed portion 13*a* and the second recessed portion 13*b*. The processing of peeling off the insulating film may be omitted. In this case, the molten solder comes into contact with the insulating film, and the insulating film is thermally decomposed, thereby exposing the metal wire.

Next, a solder paste is applied to each of the first recessed portion 13*a* on which the one end 25*a* of the conductive wire 25 is disposed and the second recessed portion 13*b* on which the other end 25*b* of the conductive wire 25 is disposed, and the solder paste is heated and melted, such that the molten solder generated by the solder paste being melted is caused to wet-spread to the inside of the first recessed portion 13*a* and the second recessed portion 13*b*. The molten solder wet-spreading in the first recessed portion 13*a* and the second recessed portion 13*b* is solidified, thereby forming the solder portion 30*a* and the solder portion 30*b*. Through the heating, the solder portion 30*a* is electrically connected to the one end 25*a* of the conductive wire 25, and the solder portion 30*b* is electrically connected to the other end 25*b* of the conductive wire 25. Also, the solder portion 30*a* is joined to the recessed portion surface that defines the first recessed portion 13*a*, and the solder portion 30*b* is joined to the recessed portion surface that defines the second recessed portion 13*b*. The solder portion 30*a* and the solder portion 30*b* may be formed by another method, such as dipping of the core 10 into a solder bath.

Next, the portion between the flange 12*a* and the flange 12*b* in the core 10 is filled with a resin, thereby forming the exterior portion 40. As described above, the coil component 1 is obtained.

Next, a method for mounting the coil component 1 on the mounting board 2*a* will be described. First, the coil component 1 is placed on the mounting board 2*a* provided with the land 3*a* and the land 3*b* such that the solder portion 30*a* faces the land 3*a* and the solder portion 30*b* faces the land 3*b*. Then, the mounting board 2*a* with the coil component 1 placed thereon is placed in a heating furnace, and the mounting board 2*a* is heated to or above the melting temperature of the solder portion 30*a* and the solder portion 30*b* in the heating furnace. Through the heating, the solder portion 30*a* and the solder portion 30*b* are melted to generate molten solder, and the molten solder wet-spreads along the land 3*a* and the land 3*b*. The wet-spreading molten solder is solidified, thereby forming the solder joining portion 130*a* and the solder joining portion 130*b*. In this manner, the coil component 1 is joined to the mounting board 2*a* with the solder joining portion 130*a* and the solder joining portion 130*b*.

A part of the molten solder generated by the solder portion 30*a* being melted wet-spreads to the first end surface 10*c*. The molten solder wet-spreading to the first end surface 10*c* is solidified, thereby forming solder fillet across the first end surface 10*c* and the land 3*a*. Similarly, a part of the molten solder generated by the solder portion 30*b* being melted wet-spreads to the second end surface 10*d*. The molten solder wet-spreading to the second end surface 10*d* is solidified, thereby forming solder fillet across the second end surface 10*d* and the land 3*b*. In the case in which fillet is formed, it is possible to enhance joint strength of the coil component 1 with respect to the mounting board 2*a*. A part of the molten solder generated by the solder portion 30*a* being melted wet-spreads to a part of the first end surface 10*c* beyond the raised portion 14 while another part remains in the first recessed portion 13*a* with movement thereof restricted by the raised portion 14. In this manner, the solder joining portion 130*a* can extend to a part of the first end surface 10*c* while maintaining electrical connection with the one end 25*a* of the conductive wire 25.

After the coil component 1 is mounted on the mounting board 2*a* as described above, it is possible to determine whether or not satisfactory joint has been achieved by observing the solder fillet using a commercially available inspection apparatus (VT-RNS series from Omron Corporation, for example). If the inclination and the amount of fillet are within predetermined ranges, it is determined that the joint of the coil component 1 to the mounting board 2*a* has been satisfactorily achieved.

Next, effects of the aforementioned embodiments will be described. In the one or more embodiments of the present invention, the molten solder generated by the outer region 30*a*1 in the solder portion 30*a* being melted is likely to wet-spread toward the first end surface 10*c* along the surface of the outer region 30*a*1, and the molten solder generated by the inner region 30*a*2 being melted is likely to wet-spread toward the side opposite to the first end surface 10*c* along the surface of the inner region 30*a*2 when the coil component 1 is mounted on the mounting board 2*a*. The solder portion 30*a* in the one or more embodiments of the present invention is configured such that the volume of the outer region 30*a*1 is larger than the volume of the inner region 30*a*2, and it is thus possible to cause a sufficient amount of molten solder to wet-spread to the first end surface 10*c* at the time of the mounting. In this manner, fillet is likely to be formed at the first end surface 10*c* in the coil component 1 mounted on the mounting board 2*a*.

In the one or more embodiments of the present invention, the solder portion 30*a* has the peak 31 projecting beyond the mounting surface 10*b*. Therefore, it is possible to supply a sufficient amount of molten solder for forming the fillet from the solder portion 30*a*.

In the one or more embodiments of the present invention, the entire solder portion 30*a* is located inside (the positive side in the L-axis direction) beyond the first end surface 10*c*, the solder portion 30 is not in contact with the first end surface 10*c* before the mounting, and it is thus possible to prevent error determination in determination regarding whether or not satisfactory joint has been achieved by the solder that is present in the first end surface 10*c* before the mounting.

According to the one or more embodiments of the present invention, a part of the solder portion 30 is provided in the first end surface 10*c* before the mounting, the molten solder is further likely to wet-spread toward the first end surface 10*c* at the time of the mounting. In this manner, the formation of the fillet on the first end surface 10*c* is further facilitated.

The effects described hitherto are also applied to the solder portion 30*b*. In other words, the volume of the outer region is larger than the volume of the inner region in the solder portion 30*b* as well, and it is thus possible to cause a sufficient amount of molten solder to wet-spread to the second end surface 10*d* at the time of the mounting.

The dimension, the material, and the disposition of each component described in the specification are not limited to those explicitly described in the embodiments, and each component can be modified to have arbitrary dimension, material, and disposition that can be included within the scope of the present invention. Moreover, components that have not been explicitly described in the specification can be added to the described embodiments, or a part of the components described in each embodiment can be omitted.

What is claimed is:

1. A coil component comprising:

a core including a mounting surface extending from one end to the other end along a one-axis direction, a recessed portion connected to the one end of the mounting surface in the one-axis direction and recessed from the mounting surface, and an end surface connected to the recessed portion;

a conductive wire wound around the core with one end disposed at the recessed portion; and a solder portion provided at the recessed portion to be electrically connected to the one end of the conductive wire, the solder portion having a curved surface, the solder portion including a peak projecting from the mounting surface, the solder portion being configured such that a distance between the curved surface of the solder portion and a plane passing through the mounting surface of the core is longest at the peak, the solder portion being sectioned into an inner region and an outer region by a border line extending through the peak in a direction perpendicular to the mounting surface, the inner region located farther from the end surface than the border line in the one-axis direction, and the outer region located closer to the end surface than the border line in the one-axis direction and having a larger volume than the inner region.

2. The coil component according to claim 1, wherein the outer region has a larger surface area than the inner region.

3. The coil component according to claim 1, wherein the solder portion is separated from the end surface.

4. The coil component according to claim 1, wherein the solder portion is in contact with the end surface.

5. The coil component according to claim 4, wherein the solder portion covers a connecting region in the end surface, the connecting region being continuous with the mounting surface.

6. The coil component according to claim 1, wherein the peak of the solder portion is located closer to the other end than a center of a section of the conductive wire in the one-axis direction.

7. The coil component according to claim 1, wherein the recessed portion is defined by a recessed portion surface occupying a part of a surface of the core, and the recessed portion surface includes a bottom surface and a connecting surface disposed between the bottom surface and the end surface in the one-axis direction and disposed between the mounting surface and the bottom surface of the recessed portion in a direction that is perpendicular to the one-axis direction.

8. The coil component according to claim 7, wherein the recessed portion surface includes an intermediate surface disposed between the bottom surface and the mounting surface in the one-axis direction and disposed between the mounting surface and the connecting surface in the direction that is perpendicular to the one-axis direction.

9. The coil component according to claim 7, wherein the recessed portion surface has a bottom surface, and a diameter of the conductive wire is smaller than a distance between the mounting surface and the bottom surface.

10. A coil component comprising:

a core including a mounting surface extending from one end to the other end along a one-axis direction, a recessed portion connected to the one end of the mounting surface in the one-axis direction and recessed from the mounting surface, and an end surface connected to the recessed portion;

a conductive wire wound around the core with one end disposed at the recessed portion; and a solder portion provided at the recessed portion to be electrically connected to the one end of the conductive wire, the solder portion having a curved surface, the solder portion including a peak projecting from the mounting surface, the solder portion being configured such that a distance between the curved surface of the solder portion and a plane passing through the mounting surface of the core is longest at the peak, the solder portion being sectioned into an inner region and an outer region by a border line extending through the peak in a direction perpendicular to the mounting surface, the inner region located farther from the end surface than the border line in the one-axis direction, and the outer region located closer to the end surface than the border line in the one-axis direction and having a larger volume than the inner region.

* * * * *